UNITED STATES PATENT OFFICE.

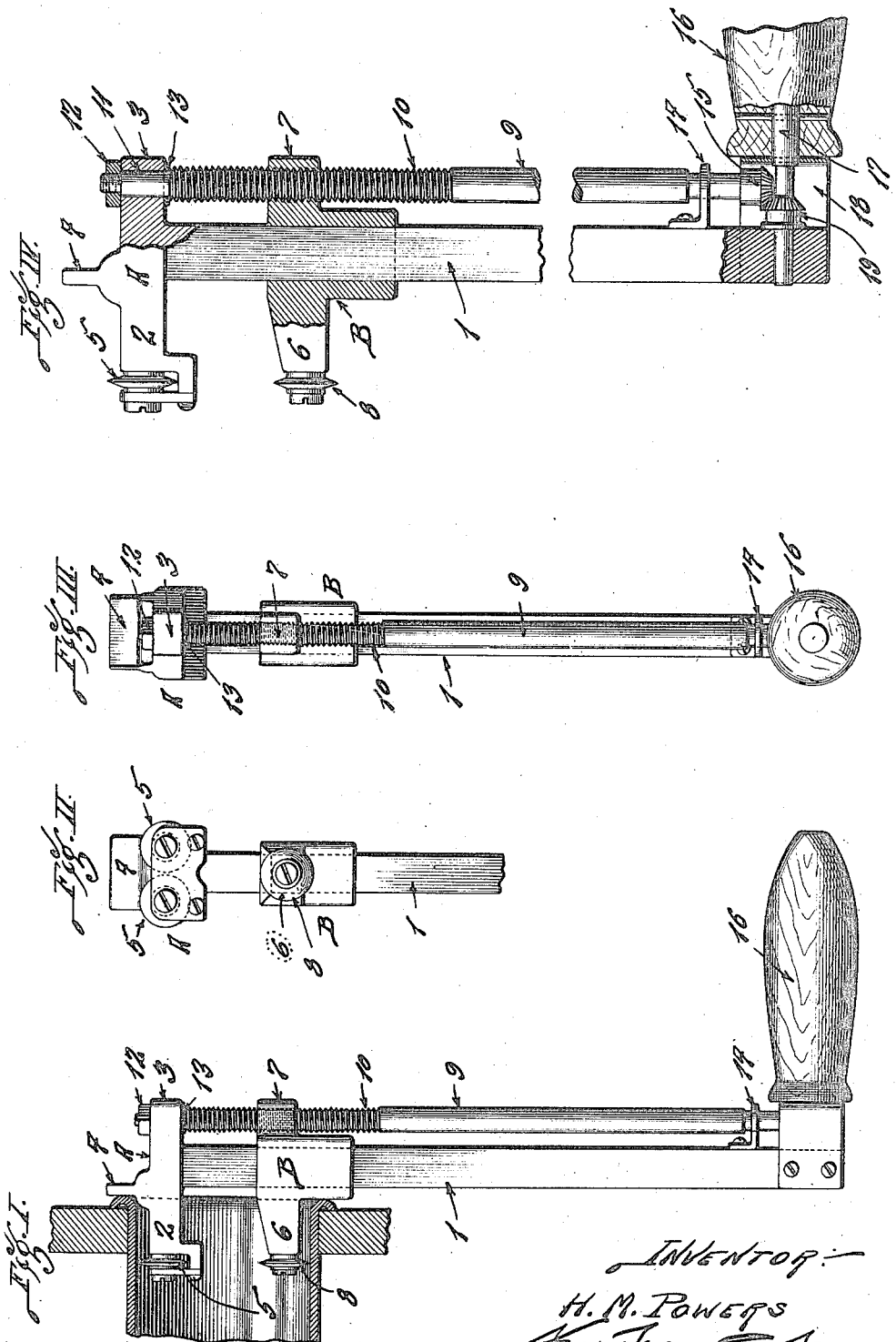

HERMAN M. POWERS, OF PIERCE CITY, MISSOURI.

FLUE-CUTTER.

1,240,779.

Specification of Letters Patent.

Patented Sept. 18, 1917.

Application filed August 30, 1916. Serial No. 117,659.

*To all whom it may concern:*

Be it known that I, HERMAN M. POWERS, a citizen of the United States of America, and a resident of Pierce City, in the county of Lawrence and State of Missouri, have invented certain new and useful Improvements in Flue-Cutters, of which the following is a full, clear, and exact description, reference being had to the accompanying drawing, forming a part of this specification.

My invention relates to an implement for cutting flues or tubes in order that they may be removed from steam boilers, one of the objects of the present invention being to provide an instrument of this kind which may be operated with ease and will perform its intended function rapidly. Another object of the invention is to provide a flue cutter having a wide range of utility for the cutting of various size flues, with the cutting accomplished in each instance within the flue immediately back of the boiler head or plate. A still further object of the invention is to provide a flue cutter having cutter holders, one of which is movable in a direction away from the other and including means whereby the movable cutter holder is automatically fed away from the other cutter holder during the circuits of the cutters carried by said cutter holders.

Figure I is a side elevation of my flue cutter, illustrated in the position assumed when cutting a boiler flue, the flue and head plate of a boiler being shown in section.

Fig. II is a rear elevation of the end portion of my cutter at which the cutting elements are located.

Fig. III is a front elevation of the cutter.

Fig. IV is an enlarged view partly in side elevation and partly in longitudinal section.

In the drawings, 1 designates the stock of my flue cutting implement, the said stock being preferably rectangular or non-circular in cross section. At one end of the stock is a head A which is integral with or fixed to the stock and includes a rearwardly extending arm 2 and a forwardly extending arm 3. The said head also carries a stop 4 which extends longitudinally of the implement beyond said head. Cutters 5 are carried by the rearwardly extending arm 2 of the head A, these cutters being preferably of circular form and being suitably journaled to the arm 2 in order that they will turn upon their axes. I have shown two of such cutters arranged in a plane extending transversely relative to the stock of the cutting implement, but it is obvious that any other desired number of the cutters might be utilized.

B designates a slider movable upon the stock 1 and having a rearwardly extending arm 6 and a forwardly extending boss 7. The arm 6 of the slider serves to carry a cutter 8 which is preferably of circular form and journaled to said arm. This cutter also provides an inner bearing for the implement. The boss 7 has a screw threaded bore extending therethrough.

9 designates a feed screw for adjusting the head and slider with relation to each other and extending longitudinally of my implement and being parallel with the stock 1. The screw thread 10 of this feed screw is operable in the screw threaded bore in the boss 7 of the slider B, and one end of the feed screw is journaled at 11 in the forward arm 3 of the head A. This end of the feed screw extends through said arm 3 and receives a nut 12 which, in conjunction with a thrust washer 13 at the opposite face of the arm 3, serves to hold the feed screw from longitudinal movement in said arm. The opposite end of the feed screw is journaled in a bracket 14 attached to the stock 1, and at the extremity of this end of the feed screw is a bevel gear wheel 15.

16 designates a grip handle having a shaft 17 keyed thereto. The said shaft 17 and the handle fixed to it extend outwardly from the end of the stock 1 farthest from the head A, and the shaft is journaled in said stock and also in a bearing box 18 fixed to the stock and extending outwardly therefrom. A bevel gear wheel 19 is fixed to the shaft 17 and arranged in mesh with the bevel gear wheel 15.

In the practical use of my flue cutter the implement is applied to the interior of the flue to be cut, as is clearly illustrated in Fig. I, the slider B having previously been adjusted away from the head A to a degree that will provide for the cutters 5 and 8 touching the inside face of the flue at diametrically opposite, or at substantially diametrically opposite points. When the implement is applied as stated, the stop 4 projecting beyond the head A and the rear face of the slider B rest against the outer end of the flue to be cut, to gage the distance to which the cutters 5 and 8 are extended into the flue and these abutting parts of the implement serve to hold the implement from tilting relative to the flue while the cutters are in action. To perform the cutting action the operator grips the grip handle 16 and moves it in a circular path in the same manner as a crank would be turned, and, as a consequence of this movement, the shaft 17 is caused to rotate the feed screw 9. The said feed screw in turning turns in the boss 7 of the slider B and causes said slider to be gradually moved in a direction away from the head A. During such operation the cutters 5 and 8 travel in a circular path against the flue to be cut and cut gradually into said flue, continuing the cutting action as the slider moves away from the head under the influence of the feed screw 9 until the flue has been completely cut.

I claim:—

1. A flue cutting implement comprising a stock, a cutter holder fixed to said stock, a cutter holder movable on said stock, cutters carried by said cutter holders, a handle journaled to said stock whereby the stock may be moved in a circular path while the cutters are arranged within a tube, and means operable by said handle whereby the movable cutter holder may be fed in a direction away from the other cutter holder, the last mentioned means being coöperable with said handle.

2. A flue cutting implement comprising a stock, a cutter holder fixed to said stock, a cutter holder movable on said stock, cutters carried by said cutter holders, a handle journaled to said stock whereby said stock may be moved in a circular path while the cutters are arranged within a tube, and means operable by said handle whereby the movable cutter holder may be fed in a direction away from the other cutter holder, the last mentioned means being operable by said handle.

3. A flue cutting implement comprising a stock, a cutter holder fixed to said stock, a second cutter holder slidable upon said stock, cutters carried by said cutter holders, a feed screw rotatably connected to said stock for imparting movement to said second cutter holder while the holders are arranged within a tube, a handle journaled to said stock, and means whereby rotative movement of said handle may be transmitted to said feed screw to cause the latter to feed the movable cutter holder in a direction away from the first cutter holder.

4. A flue cutting implement comprising a stock, a cutter holder fixed to said stock, a second cutter holder slidable upon said stock, cutters carried by said cutter holders, a feed screw rotatably connected to said stock and lying parallel therewith, a handle extending outwardly from said stock and having a shaft therein journaled to the stock, and gearing connecting said shaft to said feed screw.

HERMAN M. POWERS.

Copies of this patent may be obtained for five cents each, by addressing the "Commissioner of Patents, Washington, D. C."